United States Patent [19]

Rodewald et al.

[11] 4,093,543

[45] June 6, 1978

[54] DECOMPOSITION OF FORMIC ACID IN VERY LOW CONCENTRATION

[75] Inventors: Paul G. Rodewald, Rocky Hill; Werner O. Haag, Trenton, both of N.J.

[73] Assignee: Mobil Oil Corporation, New York, N.Y.

[21] Appl. No.: 725,211

[22] Filed: Sep. 22, 1976

[51] Int. Cl.$^2$ ............................................. C02B 1/18
[52] U.S. Cl. .................................. 210/59; 260/668 R
[58] Field of Search ..................... 210/63, 59, DIG. 1; 260/668 R, 676, 542; 252/461

[56] References Cited

U.S. PATENT DOCUMENTS

| | | | |
|---|---|---|---|
| 2,690,425 | 9/1954 | Moses et al. | 210/63 R |
| 3,894,102 | 7/1975 | Chang et al. | 260/668 R |
| 3,937,797 | 2/1976 | Romanski et al. | 252/461 |

OTHER PUBLICATIONS

*Chemical Abstracts*, vol. 75: 75811x; "Factors Determining the Selectivity of Titanium Dioxide and Chromium Oxide During the Catalytic Decomposition of Formic Acid," (1971).

*Chemical Abstracts*, vol. 77: 105936c; "Factors Pertaining to the Selectivity of Titanium Dioxide and Chromic Oxide in the Catalytic Decomposition of Formic Acid," (1972).

*Chemical Abstracts*, vol. 77: 665919; "Thermal Decomp. of 3rd Metal Formates", Relation to the Catalytic Activity of the Corresponding Metal Oxides in the Decomposition of Formic Acid, (1972).

*Chemical Abstracts*, vol. 72: 59670h; "Influence of the Porous Structure of Silica Gel on the Catalytic Decomposition of Formic Acid"; (1970).

*Primary Examiner*—Charles N. Hart
*Assistant Examiner*—Benoit Castel
*Attorney, Agent, or Firm*—Charles A. Huggett; Michael G. Gilman; Alverna M. Paulan

[57] ABSTRACT

The use of titania, zirconia, coprecipitated titania-zirconia or caustic on an inert solid inorganic support such as alumina or titania-zirconia to decompose formic acid in very dilute aqueous solutions thereof.

7 Claims, No Drawings

DECOMPOSITION OF FORMIC ACID IN VERY LOW CONCENTRATION

This invention relates to reducing or eliminating waste disposal problem of low pH aqueous streams containing very small proportions of formic acid. It more particularly refers to alleviating a waste disposal problem with respect to an aqueous by-product stream in the production of synthetic hydrocarbon gasoline by the catalytic conversion of lower oxygenated organic chemicals, particularly methanol.

There has recently been discovered a novel process for the conversion of lower aliphatic oxygenated organic compounds to high quality hydrocarbon gasoline containing large proportions of aromatics. According to this process, which is more fully described in U.S. Pat. Nos. 3,894,102, 3,894,103, 3,894,104, 3,894,105, 3,894,106 and 3,894,107, a lower aliphatic oxygenated organic compound or mixture thereof, particularly a monohydric alcohol or corresponding ether, is contacted with a heterogeneous catalyst comprising a crystalline aluminosilicate zeolite having a silica to alumina ratio of at least 12, a constraint index of 1 to 12 and preferably a crystal density of not substantially below about 1.6 grams per cubic centimeter, at a temperature of about 500° to 1200° F, preferably about 700° to 850° F for a time sufficient to convert all or part of the oxygenate feed to a three phase product including, an aqueous phase, a normally liquid hydrocarbon phase ($C_5$—400° F) and a normally gaseous hydrocarbon phase ($C_4^-$). The product can be resolved by ordinary conventional techniques, such as pressure and temperature reduction and decantation, to separate these three phases. The normally liquid hydrocarbon phase is usually high octane, aromatic gasoline. The light gases are often recycled to the reactor. The aqueous portion of the product is sewered.

In developing this process, toward commercialization, it has been discovered that the aqueous portion of the product contains very small quantities of formic acid, much less than 1 weight percent, usually less than 0.1 weight percent, and a concommitent low pH, usually less than 4. This aqueous stream is highly corrosive and too contaminated to be conventionally sewered without some deacidification pretreatment.

There is an existing body of art concerned with formic acid decomposition. The literature (see for instance SACHTLER and FAHRENFORT, PROCEEDINGS OF THE SECOND INTERNATIONAL CONGRESS IN CATALYSIS, PARIS 1960 VOLUME 1 p 849) has suggested that noble metals, particularly nickel and/or platinum, are excellent formic acid decomposition catalysts. The obvious choice for remedying the difficulty set forth above therefore was to contact the aqueous effluent from this process with these known catalysts in an effort to reduce formic acid content and increase pH to an acceptable level.

Unfortunately, these known and recommended catalysts do not seem to have a significant effect upon formic acid content of aqueous fractions when large amounts of water are present. Even at 400° C and space velocities of about 2 to 4, the greatest increase in pH has been from a feed pH of about 3 to an efficient pH of about 3.8. This is not satisfactory for industrial waste disposal of the aqueous stream via sewering.

It is therefore an important object of this invention to provide a method of increasing the pH of a very dilute aqueous solution of formic acid.

It is a further object of this invention to provide a novel method of improving the sewerability of the aqueous by-product of the manufacture of hydrocarbon gasoline from lower aliphatic organic oxygenated.

Other and additional objects of the invention will become apparent from a consideration of this entire specification including the claims hereof.

In accord with and fulfilling these objects, one aspect of this invention resides in the use of a particular catalyst: titania, zirconia, coprecipitated titania-zirconia, caustic on an inert inorganic solid support such as caustic on alumina, titania-zirconia, silica, titania, zirconia or the like or mixtures thereof, to decompose very dilute aqueous solutions, i.e., less than 1 weight percent, of formic acid. The preferred catalyst is coprecipitated titania-zirconia, which may have caustic incorporated therewith, because it is active to decompose aqueous formic acid solutions in concentration of 0.1 weight percent or even lower. Prior art Group VIII catalysts have not been found to be effective for this use.

It is of particular importance, and this is a significant feature of this invention, that the catalysts described and particularly pointed out above are effective to increase the pH (reduce the acidity) of by-product water streams even in admixture with massive amounts of diluting hydrocarbons and without adversely affecting the composition of said hydrocarbon stream. Thus one important use of this invention is in the treatment of the whole product of the conversion of lower aliphatic oxygenates to water and hydrocarbons.

According to this aspect of this invention, a lower aliphatic oxygenate, such as methanol or other $C_2$ to $C_8$ alcohols, ethers of one or a mixture of these alcohols, carbonyl containing compounds such as $C_3$ to $C_8$ ketones, esters or aldehydes, or mixtures of these compounds with each other and/or with carboxylic acids of any chain length and/or with formaldehyde and/or acetaldehyde, is suitably contacted with a special zeolite, having a high silica to alumina ratio of at least 12, a constraint index (as defined in one or more of the above numbered prior patents) of 1 to 12, and preferably a crystal density of not substantially below about 1.6 grams per cubic centimeter, such as ZSM-11, ZSM-12, ZSM-35, ZSM-38 and preferably ZSM-5.

The contact is at a temperature of at least 500° F sufficient to sustain the conversion to a substantial quantity of monocyclic aromatic hydrocarbons, such as benzene, toluene, xylenes, trimethyl, and tetra methyl benzenes. Under preferred operating conditions of about 700° to 850° F using a methanol or dimethyl ether preferred feed, the conversion is substantially quantitative with about half the product being hydrocarbon (actually about 44% in the case of a methanol feed) and the other half being water.

While it may be practical to resolve this mixed product into its components before further treatment, it is preferred to cascade the entire product, hydrocarbon and aqueous phase alike, over the novel catalyst of this invention at the zeolite conversion reaction zone outlet temperature. This temperature is not critical and may range from about 500° to 1200° F at a space velocity of about 0.1 to 20 LHSV. It is convenient to use the catalyst of this invention as a second, downstream bed in the same reaction zone as the zeolite conversion catalyst. It is also an appropriate alternative to house the formic acid decomposition catalyst in a separate downstream reaction zone. This latter configuration permits greater flexibility in choosing operating parameters so as to maximize the efficiency of each separate operation.

The following Examples are illustrative of the practice of this invention without being limiting on the scope thereof. Parts and percentages are by weight unless expressly stated to be on some other basis.

EXAMPLE 1

Coprecipitated titania-zirconia was prepared as follows:

To 5 liters of distilled water was added with stirring 58.28 g. $ZrCl_4$ and 47.50 g. $TiCl_4$. To this solution was slowly added 150 cc. concentrated aqueous ammonia over a period of ½ hour. The precipitate was filtered, dispersed in 6 liters of distilled water, and filtered. This washing step was repeated for a total of three washings. The product was dried for 16 hours at 110° C, powdered, and calcined at 538° C for 3 hours.

EXAMPLE 2

Caustic on alumina was prepared as follows:

To 5.00 g. -alumina powder was added with stirring 0.495g. NaOH dissolved in 20 cc. water. The water was evaporated at 80° C under a stream of nitrogen. The product was calcined at 1° C/min. to 538° C, then 6 hours at 538° C.

Caustic on titania-zirconia was prepared as described above in Example 2 by substitution of 5.00 g. titania-zirconia for 5.00 g. -alumina.

EXAMPLES 3-11

In order to illustrate the practice and practicality of this invention in its preferred use aspect, methanol was contacted with a catalyst consisting of 35% HZSM-5 crystalline aluminosilicate zeolite and 65% alumina binder at a temperature of 750° F and a space velocity of 1.4 LHSV to quantitatively convert the methanol to $C_5^+$ normally liquid hydrocarbons, $C_4^-$ normally gaseous hydrocarbons and an aqueous fraction. In Examples 3-9, the total reaction production, including both aqueous and hydrocarbon phases, was cascaded over the various catalysts indentified in the Table. In Examples 10-11, the reaction product was separated into a hydrocarbon and an aqueous stream containing 0.023 weight percent formic acid (pH of 3.0); this acidic water was passed over various catalysts identified in the Table below at a temperature of 750° F. The pH of the resulting aqueous effluent is a measure of formic acid decomposition and therefore of the effectiveness of the catalyst. An aqueous effluent pH of 4 or higher is an acceptable stream, from this point of view, for sewering.

TABLE 1

| Example No. | 3 | 4 | 5 | 6 | 7 | 8 | 9 | 10 | 11 |
|---|---|---|---|---|---|---|---|---|---|
| CATALYST PARTS | | | | | | | | | |
| HZSM-5 | 1 | 0.5 | 0.5 | 0.5 | 1 | 1 | 1 | 1 | 2 |
| NiO/ZSM-5 | | 0.5 | | | | | | | |
| Ni/ZSM-5 | | | 0.5 | | | | | | |
| Pt/$Al_2O_3$ | | | | 0.5 | | | | | |
| NaOH/$Al_2O_3$ | | | | | 1 | | | | |
| $TiO_2$-$ZrO_2$ | | | | | | 1 | | | |
| NaOH/$TiO_2$-$ZrO_2$ | | | | | | | 1 | | |
| $TiO_2$ | | | | | | | | 1 | |
| $ZrO_2$ | | | | | | | | | 1 |
| pH | 3.0 | 3.0 | 3.2 | 3.8 | 5.8 | 4.2 | 5.7 | 4.4 | 4.4 |

The caustic on inorganic substrate catalyst may contain about 1 to 20 weight percent caustic. The coprecipitated titania-zirconia may have a respective mole ratio of about 4 to 1 to 1 to 4. The catalyst is suitably a solid in the form of particles or pellets about 0.02 to 1 cm. in average particle size.

We claim:

1. The process of increasing the pH of a very dilute solution of formic acid to 4.0 or higher which comprises contacting said solution with a heterogeneous formic acid decomposition catalyst consisting essentially of caustic on a solid inorganic substrate selected from the group consisting of alumina, titania-zirconia, titania, zirconia, silica, and mixtures thereof, at a temperature of from about 500° to 1200° F, said solution containing up to about 1.0 weight percent of formic acid.

2. The process claimed in claim 1 wherein the formic acid content of said solution is up to about 0.1 weight percent.

3. The process claimed in claim 1 wherein said catalyst is caustic on alumina.

4. The process claimed in claim 1 wherein said catalyst is caustic on coprecipitated titania-zirconia.

5. The process claimed in claim 1 wherein said catalyst is caustic on titania.

6. The process claimed in claim 1 wherein said catalyst is caustic on zirconia.

7. The process claimed in claim 1 wherein said catalyst is caustic on silica.

* * * * *

UNITED STATES PATENT AND TRADEMARK OFFICE
CERTIFICATE OF CORRECTION

PATENT NO. : 4,093,543
DATED : June 6, 1978
INVENTOR(S) : Paul G. Rodewald and Werner O. Haag It is certified that error appears in the above-identified patent and that said Letters Patent are hereby corrected as shown below:

Col. 1, between lines 2 and 3 insert the following

--The work described in this application was completed under contract with the United States Government, Office of Coal Research.--.

Signed and Sealed this

Twenty-third Day of January 1979

[SEAL]

Attest:

RUTH C. MASON
Attesting Officer

DONALD W. BANNER
Commissioner of Patents and Trademarks